MAGNETIC PROXIMITY SWITCH DISPATCH SYSTEM

Filed Feb. 2, 1959 2 Sheets-Sheet 1

INVENTORS:
WILLIAM H. DEVONSHIRE, JAMES M. MORAN,
RICHARD LUNDBERG and ELBRIDGE G. HOAG
BY:
Bean, Brooks, Buckley & Bean
ATTORNEYS INVENTORS:
WILLIAM H. DEVONSHIRE, JAMES M. MORAN,
RICHARD LUNDBERG and ELBRIDGE G. HOAG
BY:
Bean, Brooks, Buckley & Bean.
ATTORNEYS

3,074,353
MAGNETIC PROXIMITY SWITCH DISPATCH SYSTEM

William H. Devonshire, Williamsville, N.Y., and James M. Moran, Leominster, Richard Lundberg, Ashby, and Elbridge G. Hoag, Lunenburg, Mass., assignors to Columbus McKinnon Corporation, Tonawanda, N.Y.

Filed Feb. 2, 1959, Ser. No. 790,440
18 Claims. (Cl. 104—88)

This invention relates to dispatch systems for determining the destinations of trolleys moving along a conveyor system having branches, and more particularly relates to the control of route selector means, such as conveyor track switches at the conveyor branches.

In connection with a system of the type including a read-out unit fixed adjacent the conveyor track ahead of each track switch and including on each trolley an encoder unit so oriented that the encoder units pass the various read-out units along the conveyor, it is a principal object of the invention to provide magnet means on one unit and magnetic responsive switches on the other unit, and these magnet means and switches being selectively positionable on the respective units to form one of a plurality of positional permutations, wherein when a permutation of magnets passes a similar permutation of magnetic switches the associated read-out unit actuates the next adjacent track switch to which it is connected.

It is another major object of the invention to provide in each read-out unit a control circuit including said magnetic switches connected so that the circuit becomes energized to operate the associated track switch only when all of the magnetic switches are simultaneously closed by the passage of an encoder unit having the complementary permutation of magnet positions corresponding with the positions of the magnetic switches.

Another important object of the invention is to provide a dispatch system wherein there is no physical contact between the encoder units on the trolleys and the read-out units fixed adjacent the conveyor tracks as the former pass the latter, thereby eliminating wear on the passing parts.

It is a further object of the invention to shield the magnetic switches against spurious actuation thereof by encoder-unit magnets adjacent to, but intended to be transversely out of register with, the particular switches which the shields serve to isolate.

A further important object of the invention is to provide means for mounting the respective magnets and magnetic switches which will permit quick and definite selection of one of a finite number of positional permutations, and which mounting means will positively retain the selected positions without likelihood of accidental displacement.

In addition, it is an object of the invention to provide indicia on the face of the encoder unit and cooperating with individual settings which incapsulate the magnets to show at a glance the particular positional permutation selected on the encoder unit, the indicia each representing one of said definite positions which can be selected for each of the incapsulated magnets.

Still another object of the invention is to provide a reset means on the branch of the track controlled by a particular read-out unit, said reset means being actuated by the passage of a trolley to return the control circuit of the associated read-out unit to a relaxed condition receptive to another trolley passing the read-out unit and having an encoder unit bearing the magnetic permutation to which the said read-out unit is responsive. It is a further object to include with said reset means a full-row indicator to show when the associated branch of the conveyor is entirely filled.

A further object of the invention is to employ a relay in said circuit to control the track switching means, and to power both the magnetic responsive switches and said relay with direct current in order to reduce the dwell time during which the magnetic switches must remain closed in order to insure definite operation of the relay, this feature of the invention adapting the dispatch system for use on high-speed conveyors.

Other objects and advantages of the invention will become apparent during the following discussion of one practical embodiment of the invention illustrated in the drawing, wherein.

Figure 1:
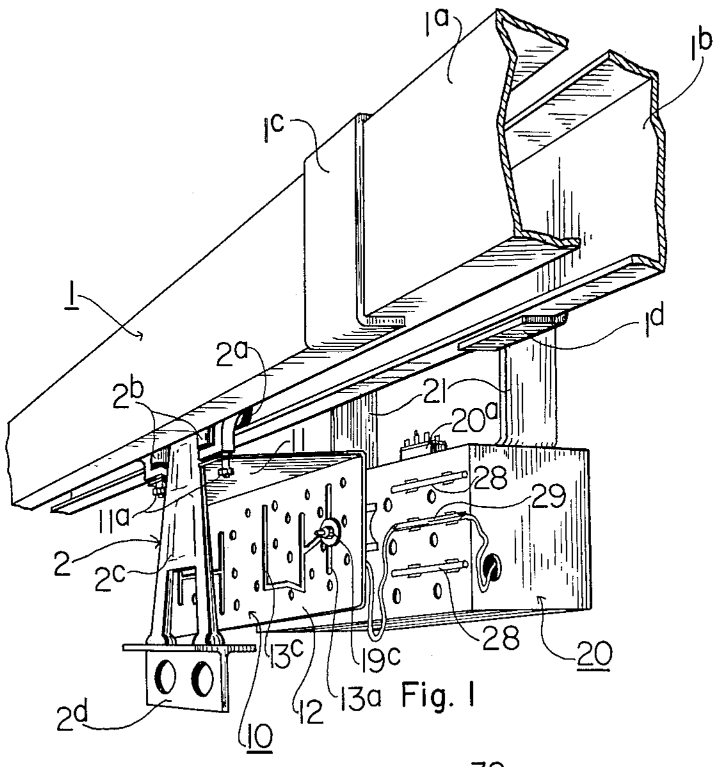
FIG. 1 is a perspective view showing the track of a conveyor and showing a load trolley suspended therefrom, the track supporting a read-out unit, and the load trolley supporting an encoder unit, and the two units being shown passing each other in parallel proximity.

Referring now to the drawings, particularly FIG. 1, a conveyor track is generally designated by the numeral 1, this conveyor track comprising a pair of channel members 1*a* and 1*b* arranged to leave a spacing therebetween in a manner well-known in the conveyor art. The channels 1*a* and 1*b* may be supported in any convenient manner, as for instance by brackets 1*c* and 1*d*. A conveyor trolley 2 of conventional type is supported on wheels 2*a* which travel on the upper surfaces of the lower flanges of the channels 1*a* and 1*b*, and also includes centering rollers 2*b* for maintaining the downwardly extending portion 2*c* of the trolley centered in the space between the lower flanges of the channels 1*a* and 1*b*. The trolley 2 may include a T-portion 2*d* from which a load of any desired type may be suspended. The structures specifically discussed so far form no part of the present invention and are merely included to illustrate an example of a conveyor to which the present dispatch system may be attached.

Figure 2:
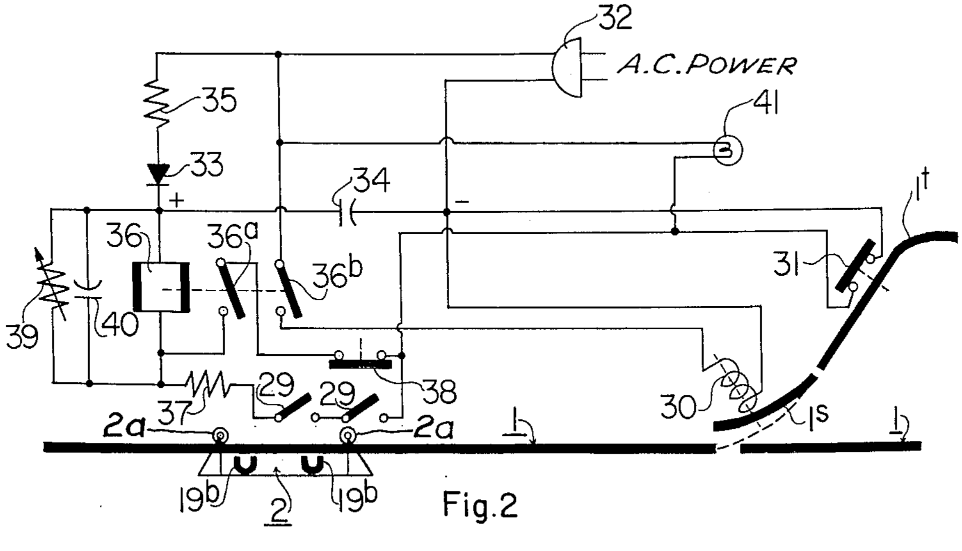
FIG. 2 is a schematic diagram illustrating the electrical control circuit of a read-out unit adjacent a conveyor and showing a trolley on the conveyor and carrying a pair of horseshoe magnets which in the position illustrated are out of alignment with the pair of switches located adjacent the track.

The dispatch system itself includes an encoder unit 10 and a read-out unit 20, the read-out circuit shown in FIG. 2 being housed within a suitable cabinet and supported adjacent the conveyor by means of suitable brackets 21.

The encoder unit 10 moves with the trolley 2 and is supported thereon at a flange 11 by screws 11*a* which pass through the flange 11 and into some convenient part of the trolley 2.

Figure 3:
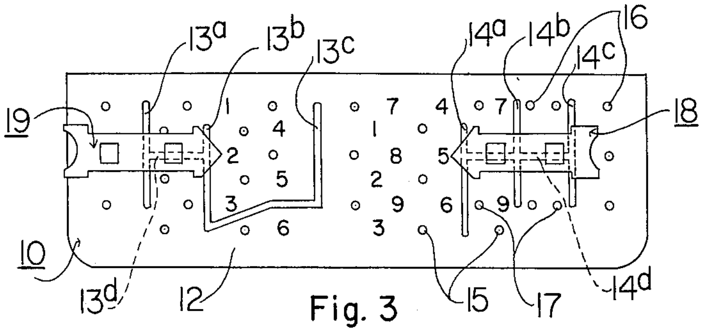
FIG. 3 is an elevation view showing the front of a permutation plate of an encoder unit, this plate being enlarged as compared with the size thereof in FIG. 1.

The encoder unit also includes a vertically oriented plate 12 which may be seen in elevation in FIG. 3. This plate contains two banks of elongated slots, the slots in each bank being vertically oriented and being joined together by substantially horizontal portions. The slots in the left bank as seen in FIG. 3 include slots 13*a*, 13*b*, and 13*c*, the first two slots being joined by the horizontal slot 13*d*. Likewise, on the right bank of the encoder plate 12 there appear slots 14*a*, 14*b*, and 14*c* which are joined together by the horizontal slots 14*d*. In addition, the encoder plate 12 include a plurality of punched holes which are mutually related in pairs, each pair forming detent means for holding a magnet setting in one of a selected plurality of possible positions. These holes are designated in pairs, for example, such as the pair of holes 15, the pair 16, or the pair 17. In all cases, however, it is to be noted that the holes which form a pair are on the same horizontal level, and are spaced apart in the manner to be described hereinafter.

Figure 5:
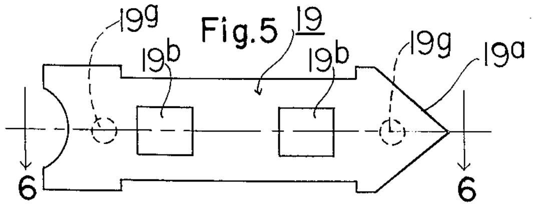
FIG. 5 is a further enlarged elevation view of one incapsulated magnet embedded in a suitable setting having the shape of an arrow.
Figure 6:
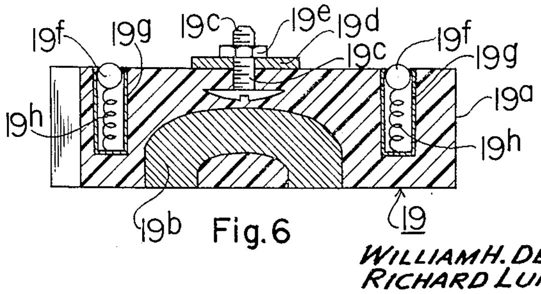
FIG. 6 is a section view taken along line 6—6 of FIG. 5.

As stated above, the encoder permutation plate 12 can be divided into right and left banks, and each of these banks supports one magnet setting, the settings being designated by the reference numerals 18 and 19, respectively, and the setting 19 being illustrated in FIGS. 5 and 6 in enlarged views. Each magnet setting comprises an arrow formed of suitable insulating material, the setting having an arrow tip 19*a* at one end which cooperates in the manner to be hereinafter described with indicia numerals as shown on the permutation plate 12 in FIG. 3. Embedded within the setting 19 is a horseshoe magnet 19*b*, the magnet being visible in cross section in FIG. 6 and the two poles of the magnet being visible in elevation in FIGS. 3 and 5. The setting 19 also includes a mounting screw 19*c* which is embedded in the resin and which extends outwardly therefrom and carries a washer 19*d* and a nut 19*e* for the purpose of captivating the setting 19 in the slots 13*a*, 13*b*, 13*c* and 13*d* of the permutation plate 12, as can best be seen in FIG. 1.

In addition, each magnet setting 19 includes ball-detent arrangements having a ball 19*f* located in a sleeve 19*g* and urged outwardly of the setting by a compression spring 19*h*. The spacing between the two balls 19*f* as shown in FIG. 6 is the same as the spacing between the holes of any pair in the permutation plate 12, such as the pairs 15, 16 or 17. The screw 19*c* then passes through one of the slots in the permutation plate 12 and captivates the magnet setting 19 thereagainst, the balls 19*f* positively locating in a pair of holes such as the pair 15 to retain the magnet setting 19 in a predetermined and definite permutation position.

With reference to the permutation plate 12 and to the sets of indicia numerals, 1–9 inclusive, which are stamped on the face of the plate, as can be seen in FIG. 3, whenever a magnet setting is arranged in a definite permutation position, the tip 19*a* of the arrow will point to one of these indicia numerals stamped on the face of the permutation plate 12. In the position shown, the left magnet setting 19 is in "Position 2" and the right magnet setting 18 is in "Position 5."

Figure 4:
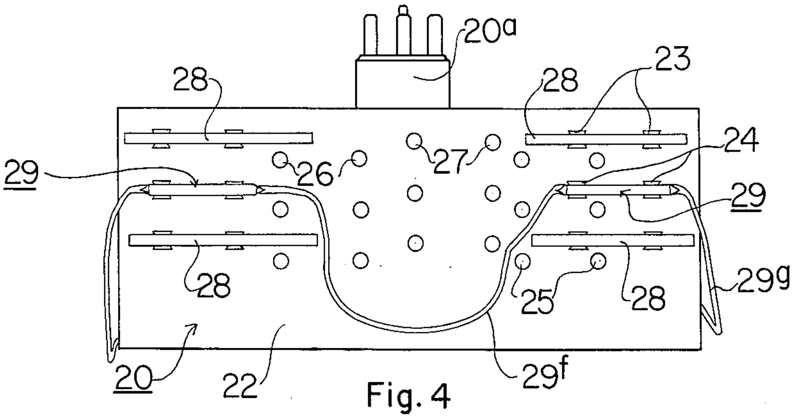
FIG. 4 is an enlarged elevation view showing the permutation plate of a read-out unit supporting two magnetic switches and four magnetic shields, the placement of the magnetic switches in FIG. 4 corresponding with the placement of the magnet means as shown in FIG. 3.
Figure 7:
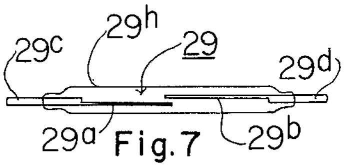
FIG. 7 is an enlarged elevation view of one of the magnetic switches illustrated in FIGS. 1 and 4.

The read-out unit 20 includes a decoder plate 22. This decoder plate also includes horizontally aligned and spaced holes at various veritcal elevations, these holes being generally designated in pairs by the numerals 25, 26 and 27. Each hole is capable of receiving and retaining a fuse clip such as the fuse clips 23 or the fuse clips 24. The fuse clips 23 support shield bars 28 made of permeable material and serving to prevent the switches 29 from being actuated by a magnet passing in a different but adjacent row, and the fuse clips 24 support magnetic proximity switches 29 of the type illustrated in FIG. 7. The switch 29 comprises two reeds 29*a* and 29*b* which in the presence of a magnetic field are deflected together so as to make mutual contact. These reeds are each connected to respective terminals 29*c* and 29*d* which are in turn soldered to wires 29*f* and 29*g*, as shown in FIG. 4. Each magnetic switch is enclosed in a sealed glass tube 29*h* and this tube is filled with an inert gas to prolong the life of the contact-ends of the reeds 29*a* and 29*b*. The switch as illustrated in FIG. 7 is a commercially available product and the details of its construction do not form a part of the present invention.

Referring now to FIG. 2, it will be seen that the conveyor 1 is provided with a switch 1*s* which is in normally open condition. When in closed condition the position of the switch will be as shown in dotted lines. The switch 1*s* is controlled by a solenoid 30 which can be seen only in FIG. 2, and in addition beyond the switch of the branch track 1*t* of the conveyor there is located a reset switch 31 which is of the normally closed variety but which is opened by the passaged of a trolley therepast, and which is maintained open if the branch track 1*t* is filled with trolleys and one of the trolleys is located adjacent the switch 31. The read-out unit circuit includes a multi-prong plug 20*a* at the top thereof and this plug serves as a connector to carry power to and from the solenoid 30 and switch 31.

The control circuit is powered from the A.C. power lines as schematically represented by the plug 32. This plug 32 furnishes power to a rectifier 33 the output of which is filtered by a condenser 34, across which appears a uni-directional filtered potential having the polarities shown in the drawing. A fuse resistor 35 is provided in series with the rectifier 33 for the purpose of protecting the latter in the event of trouble in the circuit. A two-circuit relay having a coil 36 and having contact circuits 36*a* and 36*b* is connected at one end to the rectifier 33, the relay 36 having a direct-current winding. The other side of the relay winding 36 passes through various switching means and, when one of these is complete, derives power from the minus terminal of the condenser 34 in order to energize the relay winding 36.

These switching circuits include one branch having two magnetic proximity switches 29 in series with each other, these switches being of the normally open variety, and in addition this branch includes a series current-limiting resistor 37 employed to protect the switches 29 against transient currents. The other parallel branch passes through the normally open relay contacts 36*a* and through a normally closed manual reset switch 38. One side of the reset switch 38 is joined to the rightmost magnetic proximity switch 29 and a lead passes from this junction to the automatic reset switch 31, and through this switch to the minus terminal of the condenser 34. Thus, it will be seen that whenever contact is made with this minus terminal through the automatic reset switch 31 and through either of the two parallel branches 38—36*a*, or 29—29—37, the relay winding 36 will be energized to close the relay and/or to maintain the relay closed.

In addition, across the relay winding 36 there appears a shunt circuit including a variable resistance 39 and the capacitor 40 for adjusting the time constant of the relay 36 as may prove expedient.

A light bulb 41 is arranged in the circuit in such a manner that it will be illuminated whenever the swtich 31 is closed, this light being extinguished when the switch 31 is opened so as to indicate the satisfactory operation of the reset means and also to act as a full-line indicator for indicating when the branch 1*t* of the conveyor 1 is filled.

The operation of the present device will be described with particular reference to FIG. 2, wherein as the trolley 2 travels to the right on the conveyor track 1, the magnets 19*b* will eventually move into simultaneous alignment with the two magnetic proximity switches 29 and when this happens the switches 29 will close simultaneously. The closing of the switches 29 completes the current path from the minus terminal of the condenser 34 through the normally closed switch 31, through the two temporarily closed switches 29, and through the resistor 37 so as to complete the circuit path through the relay winding 36. Brief though the closing of the switches 29 may be, the circuit is designed so that they will remain closed for a sufficient period of time to permit the relay contact switches 36*a* and 36*b* to close. When these contacts close, they close a relay holding circuit through the switch 38 and the switch 36*a* so as to maintain the relay winding 36 energized and hold the relay closed even after the trolley 2 has passed the switches 29 which immediately open in the absence of a magnetic field. Since the relay 36 remains closed, the contacts 36b remain closed and thereby retain the solenoid 30 in energized condition, at which time the track switch 1s will be in the position shown in dotted lines.

When the trolley reaches the switch 1s it will then veer to the left and travel onto the branch track 1t. Having passed the track switch 1s it will then encounter the reset switch 31, temporarily opening the latter as it passes by, and thereby breaking the circuit from the minus terminal of the condenser 34 through the switch 38 and the switch 36a. As a result of the breaking of the contacts at the switch 31, the current will be interrupted to the relay coil 36 and the relay will open. The relay may also be opened by manually opening the switch 38. When the relay opens, the solenoid 30 is de-energized and the switch 1s then returns to the position shown in full lines in FIG. 2. The circuit remains in this position until another trolley arrives at the read-out unit 20, said trolley having the magnets 19b placed on the encoder unit in such a way as to close both the switches 29 simultaneously and cause the process just described to repeat.

In the event that the branch track 1t is filled with trolleys, the last trolley to enter this track will maintain the switch 31 in open condition, thereby extinguishing the light 41 and preventing the relay 36 from being closed again, even though the magnetic proximity switches 29 may be closed by the passage of another trolley 2. In this event, this trolley will pass beyond the switch 1s shown in the full-line position and will continue on the track 1 without entering the branch track 1t.

It is extremely important to note that the positions of the magnetic proximity switches 29 must exactly correspond with the instantaneous positions of the encapsulated magnet members 18 and 19, or else there will be no actuation whatever of the relay 36. Thus, a great many possible permutations may be created. If there are 15 branch tracks corresponding with the track 1t, there will be 15 read-out units, and each of the read-out units will presumably have a different positional permutation of the magnetic switches 29. If one of the magnet members, for instance 19, is moved to another position, wherein it is either lowered or raised or else moved to one of several possible positions to the right of its position as shown in FIG. 3, the two magnets will never lie opposite the two magnetic switches 29 at the same instant of time, and therefore the trolley bearing this newly selected positional code will pass on by the read-out unit without causing the switch 1s to be closed because of the fact that the relay 36 will not be energized by this passage. The number of possible permutations is of course dependent upon the number of switches, magnets, and possible positions thereof.

For the purpose of disclosing a practical example of the present circuit, the following list of parts is divided:

Resistor 35—fuse resistor, 7.5 ohms
Resistor 39—10,000 ohms, 2 watts
Resistor 37—100 ohms, 2 watts
Rectifier 33—Sarkes Tarzian 500
Magnetic switches 29—Revere Corporation of America Type 33
Capacitors 34 and 40—40 microfarads, 450 volts
Relay 36—C. P. Clare Co. Type J The above embodiment of the invention is not intended to limit the coverage of the claims since numerous changes may be made within the scope thereof.

What is claimed is:

1. A dispatch control system for use in routing a carrier on a conveyor to a preselected destination beyond conveyor-route switching means, comprising a read-out unit fixed adjacent said conveyor ahead of said switching means, said read-out unit having a permutation plate provided with a plurality of holes arranged in longitudinal and transverse rows; at least two magnetic-field responsive proximity switches controlling said route switching means; switch supporting means engaging said plate at said holes and supporting said switching means definitely positioned in mutually spaced relation; and an encoder unit fixed to said carrier and oriented to pass in close parallel proximity to said read-out unit, said encoder unit having an encoder plate provided with a plurality of holes arranged in longitudinal and transverse rows; a magnet for each of said switches; magnet supporting means engaging said encoder plate at said holes and supporting the magnets definitely positioned on said encoder unit to form positional permutations, the possible positioned permutations of the magnets on the encoder plate corresponding precisely with the possible positions of the switch means on the permutation plate such that when the magnets come into opposed simultaneous alignment with proximity switches having the same positional permutation the latter will be actuated to thereby control said route switching means.

2. In a system as set forth in claim 1, said positional permutations including on said read-out unit mounting positions of said proximity switches spaced transversely with respect to the direction of travel of the carrier, and magnetic shields attached to the permutation plate on opposite sides of the switches, said shields comprising permeable elements coextensive with said switches and protecting the latter against actuation by magnets located in the next adjacent transverse permutation position.

3. In a system as set forth in claim 2, said encoder plate being divided into banks, one for each magnet, and having interconnected slots in each bank adjacent said holes; a setting supporting each magnet, and said magnet supporting means being secured to said settings and slidably engaging the plate at a slot, and detent means on each setting yieldably locating in said holes.

4. In a system as set forth in claim 3, indicia on said plate, and pointer means on said setting, whereby when the magnet is located in one of said permutation positions with the detent means engaging associated holes, the pointer will register with the indicia to indicate the selected position.

5. A system for actuating selector means in response to the approach of a first unit near a second unit, comprising a permutation plate on said first unit, at least two magnetic-field responsive proximity switch means connected to said selector means to control the latter, said permutation plate having proximity-switch mounting means supporting said switches and having a plurality of definite positions cooperative with said mounting means to retain said switch means in selected positional permutations, an encoder plate on said second unit, a magnet means with each switch and providing magnetic fields, and magnet mounting means connected to said encoder plate and supporting said magnet means and said encoder plate having a plurality of definite positions for retaining said magnet means in selected positional permutations, whereby when the first and second units approach each other the switch means will be actuated by said fields whenever the respective positional permutations of the switch means and of the magnet means are mutually complementary and in register.

6. In a system as set forth in claim 5, magnetic shields supported on permutation plate adjacent said switch means and protecting the latter against actuation by magnet means having different but adjacent permutation positions.

7. In a system as set forth in claim 5, said plates being provided with holes, and said mounting means for the switch means and for the magnet means engaging the plates at the holes, the holes in the plates being so located as to provide definite opposed mounting positions whereby predetermined complementary positional permutations may be positively set up on both plates.

8. In a system as set forth in claim 7, said encoder plate having interconnected slots adjacent said holes, and said magnet means including a magnet-encapsulating setting carrying said magnet mounting means, and said magnet mounting means slidably engaging the plate at a slot, and detent means on the setting yieldably locating in said holes.

9. In a system as set forth in claim 8, indicia on said plate, and pointer means on said setting, whereby when the magnet means is located in one of said permutation positions with the detent means engaging associated holes, the pointer will register with the indicia to indicate the selected position.

10. A system for actuating selector means in response to the approach of a first unit near a second unit, comprising a permutation plate on said first unit, at least two magnetic-field responsive proximity switches connected in series with said selector means to control the latter, said permutation plate having a pattern of holes exceeding the number of switches and having; proximity-switch mounting means engaging the plate at said holes and retaining said switches in selected positional permutations, an encoder plate on said second unit and having a pattern of holes, a magnet for each proximity switch and providing magnetic fields, and magnet mounting means engaging said encoder plate at said holes and supporting each magnet and said encoder plate having a pattern of definite positions corresponding with those of said switches for retaining said magnets in selected positional permutations, whereby when the first and second units approach each other the switches will be simultaneously actuated by said fields whenever the respective positional permutations of the switches and of the magnets are mutually complementary and in register.

11. In a system as set forth in claim 10, magnetic shields supported by said permutation plate adjacent said proximity switches and protecting the latter against actuation by magnets having different but adjacent permutation positions.

12. In a system as set forth in claim 11, said encoder plate being divided into banks, one for each magnet, and having interconnected slots in each bank adjacent said holes, a setting supporting each magnet, and said magnet mounting means being secured to said settings and slidably engaging the plate at a slot, and detent means on each setting yieldably locating in said holes.

13. In a system as set forth in claim 12, indicia on said plate, and pointer means on said setting, whereby when the magnet is located in one of said permutation positions with the detent means engaging associated holes, the pointer will register with the indicia to indicate the selected position.

14. A permutation-encoder magnetic actuator of the type having plural switches simultaneously actuated when first and second actuator units approach each other with the same positional permutation in mutual register, comprising at the first unit a read-out plate having a pattern of predetermined switch mounting points, said plural switches comprising magnetic field responsive switches, means cooperating with the plate and the switches and mounting the switches at different selected ones of said predetermined points to form a positional permutation of switches; and comprising at the second unit an encoder plate having interconnected slots therethrough in various areas of the plate, a magnet corresponding with each of said switches and each having a magnetic field, magnet mounting means each attached to one of the magnets and slidably captivated to the encoder plate in one of the slots, and detent means connected with the mounting means and the encoder plate and cooperating to yieldably maintain the associated magnets in definite locations thereon corresponding with definite mounting points on the read-out plate.

15. In an actuator as set forth in claim 14, the interconnected slots including at least two mutually separate groups of slots, and a magnet and mounting means in each group.

16. In an actuator as set forth in claim 14, magnetic shields comprising permeable members mounted on said read-out plate adjacent said switches and protecting the latter against actuation by magnetic fields having different but adjacent permutation positions.

17. In an actuator as set forth in claim 14, indicia on said encoder plate; and cooperating pointer means on each magnet mounting means, whereby when a magnet is located in one of said permutation positions with the detent means engaged the pointer will register with the indicia to indicate the selected position.

18. In an actuator as set forth in claim 14, said plates being provided with holes; and said mounting means for the switches and said magnet detent means engaging the plates at the holes, the holes in the plates being so located as to provide definite corresponding mounting positions on the plates when the latter are mutually opposed.

References Cited in the file of this patent

UNITED STATES PATENTS

| | | |
|---|---|---|
| 1,797,864 | Harlandt | Mar. 24, 1931 |
| 1,983,342 | Chambers | Dec. 4, 1934 |
| 2,201,013 | Rosenthal | May 14, 1940 |
| 2,548581 | Bigelow | Apr. 10, 1951 |
| 2,600,581 | Schenendorf | June 17, 1952 |
| 2,628,572 | Le Goff | Feb. 17, 1953 |
| 2,877,718 | Mittag | Mar. 17, 1959 |
| 2,898,868 | Simon | Aug. 11, 1959 |
| 2,929,896 | Ronning | Mar. 22, 1960 |